(12) United States Patent
Takata et al.

(10) Patent No.: US 10,014,503 B2
(45) Date of Patent: Jul. 3, 2018

(54) NONAQUEOUS ELECTROLYTE SECONDARY BATTERY SEPARATOR, NONAQUEOUS ELECTROLYTE SECONDARY BATTERY LAMINATED SEPARATOR, NONAQUEOUS ELECTROLYTE SECONDARY BATTERY MEMBER, AND NONAQUEOUS ELECTROLYTE SECONDARY BATTERY

(71) Applicant: Sumitomo Chemical Company, Limited, Tokyo (JP)

(72) Inventors: Atsuhiro Takata, Niihama (JP); Masateru Sembara, Niihama (JP); Hiroshi Hamamatsu, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/362,079

(22) Filed: Nov. 28, 2016

(65) Prior Publication Data

US 2017/0155111 A1 Jun. 1, 2017

(30) Foreign Application Priority Data

Nov. 30, 2015 (JP) ................. 2015-233939

(51) Int. Cl.
*H01M 2/16* (2006.01)
*H01M 2/18* (2006.01)
*H01M 10/052* (2010.01)

(52) U.S. Cl.
CPC ....... *H01M 2/1653* (2013.01); *H01M 2/1686* (2013.01); *H01M 2/18* (2013.01); *H01M 10/052* (2013.01)

(58) Field of Classification Search
None
See application file for complete search history.

(56) References Cited

U.S. PATENT DOCUMENTS

| | | | |
|---|---|---|---|
| 4,588,633 A | 5/1986 | Kono et al. | |
| 2010/0209745 A1* | 8/2010 | Kimishima | C08J 9/28 429/50 |
| 2012/0115008 A1* | 5/2012 | Sano | H01M 2/1653 429/144 |
| 2012/0129034 A1* | 5/2012 | Hasegawa | B32B 27/18 429/144 |
| 2014/0315065 A1* | 10/2014 | Mizuno | H01M 2/1686 429/145 |

FOREIGN PATENT DOCUMENTS

| | | |
|---|---|---|
| CN | 104823304 A | 8/2015 |
| JP | 60-242035 | 12/1985 |
| JP | 3347854 B2 | 11/2002 |
| JP | 2011-202105 A | 10/2011 |
| JP | 4867185 B2 | 2/2012 |
| JP | 5583998 B2 | 9/2014 |

OTHER PUBLICATIONS

Office Action dated Apr. 19, 2016 in JP Application No. JP2015-233939.
Office Action dated Dec. 7, 2017 in CN Application No. 201611078497.4.
Office Action dated Apr. 20, 2018 in CN Application No. 201611078497.4.

* cited by examiner

*Primary Examiner* — Maria Laios
*Assistant Examiner* — Robert S Carrico
(74) *Attorney, Agent, or Firm* — Panitch Schwarze Bellisario & Nadel LLP

(57) ABSTRACT

Provided is a nonaqueous electrolyte secondary battery separator including a porous film containing, as a main component, polyolefin having a weight average molecular weight of not less than 500,000, the nonaqueous electrolyte secondary battery separator having an MD orientation ratio of 58% to 80%, a degree of MD orientation of 70% to 80%, and a degree of TD orientation of 65% to 85%, the nonaqueous electrolyte secondary battery separator having a film thickness of not more than 14 μm, and the nonaqueous electrolyte secondary battery separator being excellent in shutdown temperature and puncture strength.

9 Claims, 2 Drawing Sheets

NONAQUEOUS ELECTROLYTE SECONDARY BATTERY SEPARATOR, NONAQUEOUS ELECTROLYTE SECONDARY BATTERY LAMINATED SEPARATOR, NONAQUEOUS ELECTROLYTE SECONDARY BATTERY MEMBER, AND NONAQUEOUS ELECTROLYTE SECONDARY BATTERY

This Nonprovisional application claims priority under 35 U.S.C. § 119 on Patent Application No. 2015-233939 filed in Japan on Nov. 30, 2015, the entire contents of which are hereby incorporated by reference.

TECHNICAL FIELD

The present invention relates to a separator for a nonaqueous electrolyte secondary battery (hereinafter referred to as a "nonaqueous electrolyte secondary battery separator"), a laminated separator for a nonaqueous electrolyte secondary battery (hereinafter referred to as a "nonaqueous electrolyte secondary battery laminated separator"), a member for a nonaqueous electrolyte secondary battery (hereinafter referred to as a "nonaqueous electrolyte secondary battery member"), and a nonaqueous electrolyte secondary battery.

BACKGROUND ART

Nonaqueous electrolyte secondary batteries, especially lithium secondary batteries, each of which has a high energy density, have been widely used as batteries for use in, for example, a personal computer, a mobile phone, and a portable information terminal.

Such a nonaqueous electrolyte secondary battery, typified by a lithium secondary battery, may let a large current flow and generate heat in a case where an accident such as a breakage in the battery or in a device using that battery has caused an internal or external short circuit. Thus, between a cathode and an anode of the battery, there is provided a separator that imparts, to the battery, a shutdown function of preventing further heat generation by blocking passage of ions between the cathode and the anode.

In order to achieve an electronic device that is smaller in size and lighter and has a higher capacity, there has recently been a demand for a separator that is filmy and highly strong. Against a background of this, as disclosed in, for example, Patent Literature 1 and Patent Literature 2, there have been proposed various films each of which is made of ultra-high molecular weight polyolefin having a weight average molecular weight of not less than 500,000 and various methods for producing such films. According to these methods, ultra-high molecular weight polyolefin is dissolved in a non-volatile solvent such as liquid paraffin, a gelatinous film, for example is formed from a resultant solution, the gelatinous film containing the non-volatile solvent is partially subjected to an extraction treatment with use of a volatile solvent and then heat-stretched, and thereafter a residual non-volatile solvent is extracted again.

Patent Literature 3 proposes a film that is uniformly deformed during winding of a battery by specifying (i) degrees of orientation of orientation axes 1 and 2 and (ii) and a ratio of an integral value of the orientation axis 1 to an integral value of the entire orientation.

Patent Document 4 discloses a laminated separator obtained by (i) removing, from a sheet made of a polyolefin-based resin composition obtained by molding, by rolling, a resin composition containing ultra-high molecular weight polyolefin, olefin-based wax, and a water-soluble filler, the water-soluble filler with use of an aqueous liquid, and then (ii) coating the sheet with a heat-resistant layer and a porous film that has been twofold to twelvefold stretched and is highly uniform in thickness.

CITATION LIST

Patent Literatures

[Patent Literature 1]
Japanese Patent No. 3347854 (Publication date: Nov. 20, 2002)
[Patent Literature 2]
Japanese Patent Application Publication Tokukaisho No. 60-242035 (Publication date: Dec. 2, 1985)
[Patent Literature 3]
Japanese Patent No. 5583998 (Publication date: Sep. 3, 2014)
[Patent Literature 4]
Japanese Patent No. 4867185 (Publication date: Feb. 1, 2012)

SUMMARY OF INVENTION

Technical Problem

Note, however, that such a separator as described above has a problem of failure to achieve both a low shutdown temperature and a high puncture strength. In order to achieve higher safety in a case where an internal or external short circuit occurs in a nonaqueous electrolyte secondary battery, a nonaqueous electrolyte secondary battery separator is required to have a low shutdown temperature (temperature at which the shutdown function is carried out). Note, however, that a reduction in shutdown temperature for achievement of higher safety causes a problem of a decrease in strength of a porous film.

The present invention has been made in view of the problems, and an object of the present invention is to provide a nonaqueous electrolyte secondary battery separator, a nonaqueous electrolyte secondary battery laminated separator, a nonaqueous electrolyte secondary battery member, and a nonaqueous electrolyte secondary batter each of which is excellent in shutdown temperature and puncture strength.

Solution to Problem

A nonaqueous electrolyte secondary battery separator in accordance with an aspect of the present invention includes a porous film containing, as a main component, polyolefin having a weight average molecular weight of not less than 500,000, the nonaqueous electrolyte secondary battery separator having an MD orientation ratio of 58% to 80%, a degree of MD orientation of 70% to 80%, and a degree of TD orientation of 65% to 85%, and the nonaqueous electrolyte secondary battery separator having a film thickness of not more than 14 μm.

The nonaqueous electrolyte secondary battery separator in accordance with an aspect of the present invention is preferably arranged such that the nonaqueous electrolyte secondary battery separator has a Gurley air permeability of 50 sec/100 cc to 300 sec/100 cc.

The nonaqueous electrolyte secondary battery separator in accordance with an aspect of the present invention is preferably arranged such that the polyethylene contained in the porous film has 0.1 branches to 0.9 branches per 1000 carbon atoms.

The nonaqueous electrolyte secondary battery separator in accordance with an aspect of the present invention is preferably arranged such that the polyethylene has an amount of heat of crystalline melting of 115 mJ/mg to 130 mJ/mg.

A nonaqueous electrolyte secondary battery separator in accordance with an aspect of the present invention is preferably arranged to have a shutdown temperature of 135° C. to 144° C. and a puncture strength of not less than 3.4 N.

A nonaqueous electrolyte secondary battery laminated separator in accordance with an aspect of the present invention includes: a nonaqueous electrolyte secondary battery separator mentioned above; and a porous layer.

A nonaqueous electrolyte secondary battery member in accordance with an aspect of the present invention includes: a cathode; a nonaqueous electrolyte secondary battery separator mentioned above or a nonaqueous electrolyte secondary battery laminated separator mentioned above; and an anode, the cathode, the nonaqueous electrolyte secondary battery separator or the nonaqueous electrolyte secondary battery laminated separator, and the anode being provided in this order.

A nonaqueous electrolyte secondary battery in accordance with an aspect of the present invention includes: a nonaqueous electrolyte secondary battery separator mentioned above or a nonaqueous electrolyte secondary battery laminated separator mentioned above.

Advantageous Effects of Invention

An embodiment of the present invention yields an effect of providing a nonaqueous electrolyte secondary battery separator, a nonaqueous electrolyte secondary battery laminated separator, a nonaqueous electrolyte secondary battery member, and a nonaqueous electrolyte secondary battery each, of which is excellent in shutdown, temperature and puncture strength.

DESCRIPTION OF EMBODIMENTS

Figure 1:
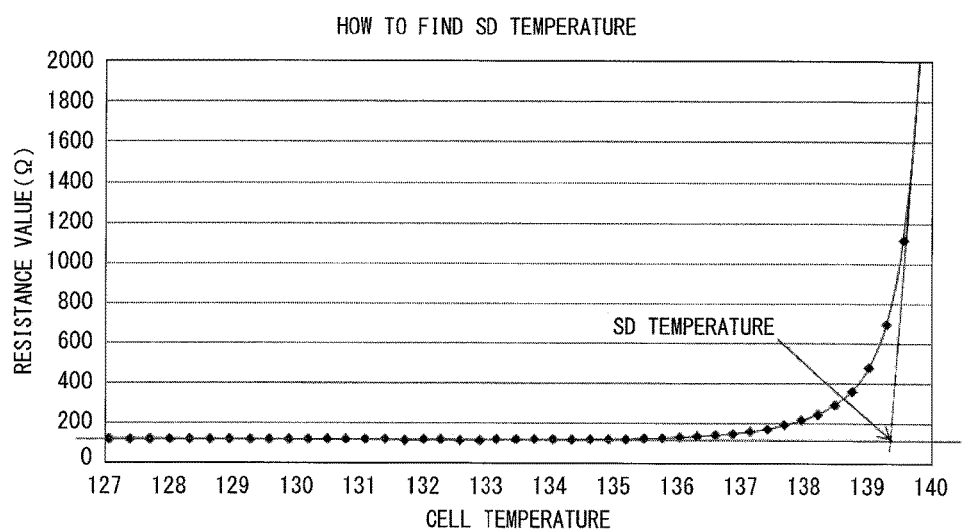
FIG. 1 shows how to find a shutdown temperature.

An embodiment of the present invention is described below. Note, however, that the present invention is not limited to such an embodiment. The present invention is not limited to arrangements described below, but can be altered by a skilled person in the art within the scope of the claims. An embodiment derived from a proper combination of technical means each disclosed in a different embodiment is also encompassed in the technical scope of the present invention. Note that a numerical range "A to B" herein means "not less than A and not more than B" unless otherwise specified.

[1. Separator]
(1-1) Nonaqueous Electrolyte Secondary Battery Separator

A nonaqueous electrolyte secondary battery separator in accordance with an embodiment of the present invention includes a porous film that is filmy and is provided between a cathode and an anode of a nonaqueous electrolyte secondary battery.

The porous film only needs to be a base material that is porous and filmy, and contains, as a main component, polyolefin-based resin having a weight average molecular weight of not less than 500,000 (polyolefin-based porous base material). The porous film is a film, that (i) has therein pores connected to one another and (ii) allows a gas or a liquid to pass therethrough from one surface to the other.

The porous film is arranged such that in a case where the battery generates heat, the porous film is melted so as to make the nonaqueous electrolyte secondary battery separator non-porous. This allows the porous film to impart a shutdown function to the nonaqueous electrolyte secondary battery separator. The porous film can be made of a single layer or a plurality of layers.

The porous film has a thickness of not more than 14 μm, preferably of not more than 11 μm. This allows the nonaqueous electrolyte secondary battery separator to be thin and allows the nonaqueous electrolyte secondary battery to have a smaller size or a higher energy density. Note that the porous film has a thickness preferably of not less than 4 μm, more preferably of not less than 5 μm, and still more preferably of not less than 6 μm. That is, the porous film has a thickness preferably of not less than 4 μm and not more than 14 μm.

The porous film of an embodiment of the present invention has a machine direction (MD) orientation ratio of 58% to 80%, preferably of 60% to 75%. The porous film which has an MD orientation ratio of not more than 80% tends to be less likely to curl in a case where the porous film is coated with a porous layer (described later). Further, the porous film which has an MD orientation ratio of not more than 80% is less likely to be ripped in the MD direction (ripped lengthwise). This makes it easy to handle the porous film. Meanwhile, the porous film which has an MD orientation ratio of not less than 58% is less likely to be stretched in the MD direction. Further, the porous film which has an MD orientation ratio of not less than 58% makes it difficult for crystallization of the porous film due to stretching (deformation) in the MD direction to progress, and easily has a shutdown temperature of not more than 144° C. Thus, the porous film which has an MD orientation ratio of 58% to 80% is prevented from being stretched in the MD direction and can have a shutdown temperature, of 135° C. to 144° C.

The porous film of an embodiment of the present invention has a degree of MD orientation of 70% to 80% and a degree of transverse direction (TD) orientation of 65% to 85%. The porous film which has a degree of MD orientation in the above range and a degree of TD orientation in the above range can be prevented from (i) being stretched in the MD direction and (ii) curling in a case where the porous film is coated with the porous layer (described later). Though the porous film which has a degree of MD orientation of more than 80% causes entire resin contained in the porous film to be in a state close to a fibrous state and is easily ripped by a tension exerted while the porous film is being transferred, the porous film which has a degree of MD orientation of not more than 80% can be prevented from being ripped as described above.

The porous film which thus has an MD orientation ratio of 58% to 80%, a degree of MD orientation of 70% to 80%, and a degree of TD orientation of 65% to 85% can (i) be prevented from being deformed (e.g., stretched in the MD direction or curling (warped) and ripped lengthwise and (ii) have a shutdown temperature of 135° C. to 144° C. Further, as shown in Examples described later, the porous film of an embodiment of the present invention can have a puncture strength of not less than 3.4 N.

Note that the MD orientation ratio, the degree of MD orientation, and the degree of TD orientation are calculated from an intensity of a peak obtained by measurement by use of an X-ray diffraction device. Specifically, an MD orientation ratio R2 is calculated based on the following equation:

$$R2=I(MD)/(I(TD)+I(MD))$$

where I(MD) and I(TD) are integrated intensities of peaks corresponding to respective MD and TD orientations in an intensity distribution of X-ray diffraction images. Note that the degree of MD orientation is calculated in the intensity distribution of X-ray diffraction images by use of H, which, is a half-width of a peak corresponding to the MD orientation, and based on the following equation:

$$\text{Degree of orientation}=[(180-H)/180]\times 100$$

Same applies to the degree of TD orientation.

The porous film has a Gurley air permeability preferably of 50 sec/100 cc to 300 sec/100 cc and more preferably of 70 sec/100 cc to 240 sec/100 cc so as to obtain sufficient ion permeability in a case where the porous film is used as the nonaqueous electrolyte secondary battery separator.

The polyolefin-based resin contained in the porous film is exemplified by a homopolymer or a copolymer which has a weight average molecular weight of not less than 500,000 and in which ethylene, propylene, 1-butene, 4-methyl-1-pentene, 1-hexene, and/or the like is/are polymerized. Of the above homopolymer and the above copolymer, high-molecular-weight polyethylene which has a weight average molecular weight of not less than 1,000,000 and which contains ethylene as a main component is preferable.

The porous film contains the polyolefin component in an amount preferably of not less than 50% by volume, more preferably of not less than 90% by volume, and still more preferably of not less than 95% by volume of the entire porous film.

The polyolefin contained in the porous film preferably has 0.1 branches to 0.9 branches per 1000 carbon atoms. The polyolefin which has a lower degree of branching causes molecules thereof to be more likely to be oriented in the TD direction while the porous film is being stretched in the TD direction, so that the shutdown temperature is easily increased. The polyolefin which has a degree of branching in the above range makes it easy to prevent, an increase in shutdown temperature.

The polyolefin contained in the porous film preferably has an amount of heat of crystalline melting (amount of heat of melting) of 115 mJ/mg to 130 mJ/mg. The polyolefin which has a higher amount of heat of melting allows the porous film to have a greater strength. Note that the amount of heat of melting is found by differential scanning calorimetry (DSC).

Meanwhile, the polyolefin which has a higher amount of heat of melting causes molecules thereof to be more likely to be oriented in the TD direction while the porous film is being stretched in the TD direction, so that the shutdown temperature is easily increased. The polyolefin which has an amount of heat of melting in the above range makes it easy to prevent an increase in shutdown temperature.

The porous film can contain low molecular weight, polyolefin having a weight average molecular weight of not more than 10,000. As the low molecular weight polyolefin, it is possible to suitably use, for example, polyethylene wax. The porous film which contains much wax that is in a form of a solid at a room temperature causes a great percentage of molecules thereof to be oriented in the MD direction, so that the shutdown temperature is easily decreased.

The porous film has a mass per unit area normally of 3 g/m$^2$ to 10 g/m$^2$ and preferably of 4 g/m$^2$ to 7 g/m$^2$ in that the porous film which has a mass per unit area falling within the above range can increase not only a strength, a thickness, handleability, and a weight thereof but also a weight energy density and a volume energy density of the nonaqueous electrolyte secondary battery for which the porous film is used.

A method for producing the porous film which contains polyolefin-based resin as a main component is not particularly limited to any specific method provided that the method realizes such a state of orientation of the porous film as described earlier. For example, the porous film which, is made of polyolefin resin containing ultra-high molecular weight polyethylene and low molecular weight polyolefin having a weight average molecular weight, of not more than 10,000 can be produced by, for example, the following method.

Specifically, the porous film which is made of polyolefin resin containing ultra-high molecular weight polyethylene and low molecular weight polyolefin having a weight average molecular weight of not more than 10,000 can be obtained by a method including the steps of: (1) obtaining a polyolefin resin composition by kneading (i) 100 parts by weight of ultra-high molecular weight polyethylene having a weight average molecular weight of not less than 500,000, (ii) 5 parts by weight to 200 parts by weight of low molecular weight polyolefin having a weight average molecular weight of not more than 10,000, and (iii) 100 parts by weight to 400 parts by weight of a pore-forming agent such as calcium carbonate or a plasticizer; (2) forming a sheet by rolling the polyolefin resin composition; (3) removing the pore-forming agent from the sheet obtained in the step (2); and (4) obtaining the porous film by stretching, in the TD direction, the sheet obtained in the step (3).

Note here that the MD orientation ratio, the degree of MD orientation, and the degree of TD orientation are adjusted in accordance with (i) a roll force exerted during the rolling in the step (2) and (ii) a stretching temperature and a draw ratio in the step (4). Specifically, an increase in roll force allows an increase in degree of MD orientation and MD orientation ratio. Further, an increase in stretching temperature and draw ratio in the TD direction allows an increase in degree of TD orientation. In this case, the state of orientation of the porous film also depends on a degree of branching and a degree of crystallinity of polyolefin resin contained in the porous film. This makes it only necessary to optimize the roll force, the stretching temperature, and the draw ratio in accordance with these degrees of branching and crystallinity.

(1-2) Nonaqueous Electrolyte Secondary Battery Laminated Separator

According to another embodiment of the present invention, it is possible to use, as a separator, a nonaqueous electrolyte secondary battery laminated separator (hereinafter may be referred to as a "laminated separator" including (i) the nonaqueous electrolyte secondary battery separator, which is the porous film, and (ii) a porous layer. Since the porous film is as described earlier, the porous layer is described here.

The porous layer is appropriately laminated to one side or both sides of the nonaqueous electrolyte secondary battery separator, which is the porous film. It is preferable that a resin of which the porous layer is made be insoluble in an electrolyte of a battery and be electrochemically stable in a range of use of the battery. The porous layer that is laminated to one side of the porous film is preferably laminated to a surface of the porous film which surface faces a cathode of a nonaqueous electrolyte secondary battery which includes the laminated separator, and is more preferably laminated to a surface of the porous film which surface is in contact with the cathode.

Examples of the resin of which the porous layer is made include: polyolefins such as polyethylene, polypropylene, polybutene, and an ethylene-propylene copolymer; fluorine-containing resins such as polyvinylidene fluoride (PVDF) and polytetrafluoroethylene; fluorine-containing rubbers such as a vinylidene fluoride-hexafluoropropylene copolymer, a tetrafluoroethylene-hexafluoropropylene copolymer, a tetrafluoroethylene-perfluoroalkyl vinyl ether copolymer, a vinylidene fluoride-tetrafluoroethylene copolymer, a vinylidene fluoride-trifluoroethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, and an ethylene-tetrafluoroethylene copolymer; aromatic polyamide; wholly aromatic polyamide (aramid resin); rubbers such as a styrene-butadiene copolymer and a hydride thereof, a methacrylate ester copolymer, an acrylonitrile-acrylic ester copolymer, a styrene-acrylic ester copolymer, ethylene propylene rubber, and polyvinyl acetate; resins having a melting point or a glass transition temperature of not less than 180° C., such as polyphenylene ether, polysulfone, polyether sulfone, polyphenylene sulfide, polyetherimide, polyamide-imide, polyether amide, and polyester; water-soluble polymers such as polyvinyl alcohol, polyethylene glycol, cellulose ether, sodium, alginate, polyacrylic acid, polyacrylamide, and polymethacrylic acid; and the like.

Known examples of the porous layer include an adhesive layer that contains a polyvinylidene fluoride-based resin and is highly adhesive to an electrode, and a heat-resistant layer that contains, for example, aromatic polyamide and is highly resistant to heat. The nonaqueous electrolyte secondary battery laminated separator which includes such a porous layer is also excellent in uniformity in film thickness, strength, and breath ability (ion permeability).

The porous layer that functions as a heat-resistant layer is exemplified by a polymer which is disclosed in Patent Document 4 and whose main chain contains a nitrogen atom. In particular, a polymer containing an aromatic ring is preferable from the viewpoint of heat resistance. Examples of such a polymer include aromatic polyamide (hereinafter may be referred to as "aramid"), aromatic polyimide (hereinafter may be referred to as "polyimide"), aromatic polyamide imide, and the like. Aramid, which is exemplified by meta-oriented aromatic polyamide (hereinafter may be referred to as "meta-aramid") and para-oriented aromatic polyamide (hereinafter may be referred to as "para-aramid"), is preferably para-aramid. This is because para-aramid makes it easy to form a porous heat-resistant resin layer that has a uniform film thickness and excellent breathability.

Para-aramid is obtained by condensation polymerization of para-oriented aromatic diamine and para-oriented aromatic dicarboxylic acid halide, and substantially includes repeating units in which amide bonds are bonded at para positions or equivalent oriented positions (for example, oriented positions that extend coaxially or parallel in opposite directions such as the cases of 4,4'-biphenylene, 1,5-naphthalene, and 2,6-naphthalene) of aromatic rings. Specific examples of the para-aramid include para-aramids each having a para-oriented structure or a structure equivalent to a para-oriented structure, such as poly(paraphenylene terephthalamide), poly(parabenzamide), poly(4,4'-benzanilide terephthalamide), poly(paraphenylene-4,4'-biphenylene dicarboxylic acid amide), poly(paraphenylene-2,6-naphthalene dicarboxylic acid amide), poly(2-chloroparaphenylene terephthalamide), and paraphenylene terephthalamide/2,6-dichloroparaphenylene terephthalamide copolymer.

The porous layer can contain a filler. Thus, in a case where the porous layer contains a filler, the resin functions also as a binder resin. The filler, which is not particularly limited to any specific filler, can be a filler made of an organic matter or a filler made of an inorganic matter. Specific examples of the filler made of an organic matter include fillers made of (i) a homopolymer of a monomer such as styrene, vinyl ketone, acrylonitrile, methyl methacrylate, ethyl methacrylate, glycidyl methacrylate, glycidyl acrylate, or methyl acrylate, or (ii) a copolymer of two or more of such monomers; fluorine-containing resins such as polytetrafluoroethylene, an ethylene tetrafluoride-propylene hexafluoride copolymer, a tetrafluoroethylene-ethylene copolymer, and polyvinylidene fluoride; melamine resin; urea resin; polyethylene; polypropylene; polyacrylic acid and polymethacrylic acid; and the like.

Specific examples of the filler made of an inorganic matter include fillers made of inorganic matters such as calcium, carbonate, talc, clay, kaolin, silica, hydrotalcite, diatomaceous earth, magnesium carbonate, barium carbonate, calcium sulfate, magnesium sulfate, barium sulfate, aluminum hydroxide, magnesium hydroxide, calcium oxide, magnesium oxide, titanium oxide, titanium nitride, alumina (aluminum oxide), aluminum nitride, mica, zeolite, and glass. The porous layer can contain (i) only one kind of filler or (ii) two or more kinds of fillers in combination.

Among the above fillers, a filler made of an inorganic matter is suitable. A filler made of an inorganic oxide such as silica, calcium oxide, magnesium, oxide, titanium oxide, alumina, mica, or zeolite is preferable. A filler made of at least one kind selected from the group consisting of silica, magnesium oxide, titanium oxide, and alumina is more preferable. A filler made of alumina is particularly preferable. Alumina has many crystal forms such as α-alumina, β-alumina, γ-alumina, and θ-alumina, and any of the crystal forms can be suitably used. Among the above crystal forms, α-alumina, which is particularly high in thermal stability and chemical stability, is the most preferable.

The filler has a shape that varies depending on, for example, (i) a method for producing the organic matter or inorganic matter as a raw material and (ii) a condition under which the filler is dispersed during preparation of a coating solution for forming the porous layer. The filler can have any of various shapes such as a spherical shape, an oblong shape, a rectangular shape, a gourd shape, and an indefinite irregular shape.

In a case where the porous layer contains a filler, the filler is contained in an amount preferably of 1% by volume to 99% by volume and more preferably of 5% by volume to 95% by volume of the porous layer. The filler which is contained in the porous layer in an amount falling within the above range makes it less likely for a void formed by a contact among fillers to be blocked by, for example, a resin. This makes it possible to obtain sufficient ion permeability and to set a mass per unit area of the porous layer at an appropriate value.

According to an embodiment of the present invention, a coating solution for forming the porous layer is normally prepared by dissolving the resin in a solvent and dispersing the filler in a resultant solution.

The solvent (dispersion medium), which is not particularly limited to any specific solvent, only needs to (i) have no harmful influence on the porous film, (ii) uniformly and stably dissolve the resin, and (iii) uniformly and stably disperse the filler. Specific examples of the solvent (dispersion medium) include: water; lower alcohols such as methyl alcohol, ethyl alcohol, n-propyl alcohol, isopropyl alcohol, and t-butyl alcohol; acetone, toluene, xylene, hexane, N-methylpyrrolidone, N,N-dimethylacetamide, and N,N-dimethylformamide; and the like. The above solvents (dispersion media) can be used in only one kind or in combination of two or more kinds.

The coating solution can be formed by any method provided that the coating solution can meet conditions such as a resin solid content (resin concentration) and a filler amount each necessary for obtainment of a desired porous layer. Specific examples of a method for forming the coating solution include a mechanical stirring method, an ultrasonic dispersion method, a high-pressure dispersion method, a media dispersion method, and the like.

Further, the filler can be dispersed in the solvent (dispersion medium) by use of, for example, a conventionally publicly known dispersing machine such as a three-one motor, a homogenizer, a media dispersing machine, or a pressure dispersing machine.

In addition, the coating solution can contain, as a component different from the resin and the filler, additive(s) such as a disperser, a plasticizer, a surfactant, and/or a pH adjuster, provided that the additive(s) does/do not impair the object of the present invention. Note that the additive(s) can be contained in an amount, that does not impair the object of the present invention.

A method for applying the coating solution to the separator, i.e., a method for forming the porous layer on a surface of the separator which has been appropriately subjected, to a hydrophilization treatment is not particularly restricted. In a case where the porous layer is laminated to both sides of the separator, (i) a sequential lamination method in which the porous layer is formed on one side of the separator and then the porous layer is formed on the other side of the separator, or (ii) a simultaneous-lamination method in which the porous layer is formed simultaneously on both sides of the separator is applicable to the case.

Examples of a method for forming the porous layer include: a method in which the coating solution is directly applied to the surface of the separator and then the solvent (dispersion medium) is removed; a method in which the coating solution is applied to an appropriate support, the porous layer is formed by removing the solvent (dispersion medium), and thereafter the porous layer thus formed and the separator are pressure-bonded and subsequently the support is peeled off; a method in which the coating solution is applied to the appropriate support and then the porous film is pressure-bonded to an application surface, and subsequently the support is peeled off and then the solvent (dispersion medium) is removed; a method in which the separator is immersed in the coating solution so as to be subjected to dip coating, and thereafter the solvent (dispersion medium) is removed; and the like.

The porous layer can have a thickness that is controlled by adjusting, for example, a thickness of a coated film that is moist (wet) after being coated, a weight ratio between the resin and the filler, and/or a solid content concentration (a sum of a resin concentration and a filler concentration) of the coating solution. Note that it is possible to use, as the support, a film made of resin, a belt made of metal, or a drum, for example.

A method for applying the coating solution to the separator or the support is not particularly limited to any specific method provided that the method achieves a necessary mass per unit area and a necessary coating area. The coating solution can be applied to the separator or the support by a conventionally publicly known method. Specific examples of the conventionally publicly known method include a gravure coater method, a small-diameter gravure coater method, a reverse roll coater method, a transfer roll coater method, a kiss coater method, a dip coater method, a knife coater method, an air doctor blade coater method, a blade coater method, a rod coater method, a squeeze coater method, a cast coater method, a bar coater method, a die coater method, a screen printing method, a spray application method, and the like.

Generally, the solvent (dispersion medium) is removed by drying. Examples of a drying method include natural drying, air-blowing drying, heat drying, vacuum drying, and the like. Note, however, that any drying method is usable provided that the drying method allows the solvent (dispersion medium) to be sufficiently removed. For the drying, it is possible to use an ordinary drying device.

Further, it is possible to carry out the drying after replacing, with another solvent, the solvent (dispersion medium) contained in the coating solution. Examples of a method for removing the solvent (dispersion medium) after replacing the solvent (dispersion medium) with another solvent include a method in which another solvent (hereinafter referred to as a solvent X) is used that is dissolved in the solvent (dispersion medium) contained in the coating solution and does not dissolve the resin contained in the coating solution, the separator or the support, on which a coated film has been formed by application of the coating solution is immersed in the solvent X, the solvent (dispersion medium) contained in the coated film formed on the separator or the support is replaced with the solvent X, and thereafter the solvent X is evaporated. This method makes it possible to efficiently remove the solvent (dispersion medium) from the coating solution.

Assume that, heating is carried out so as to remove the solvent (dispersion medium) or the solvent X from the coated film of the coating solution which coated film has been formed on the separator or the support. In this case, in order to prevent the separator from having a lower air permeability due to contraction of pores of the porous film, it is desirable to carry out heating at a temperature at which the separator does not have a lower air permeability, specifically, 10° C. to 120° C., more preferably 20° C. to 80° C.

In a case where the separator is used as the base material to form the laminated separator by laminating the porous layer to one side or both sides of the separator, the porous layer formed by the method described earlier has, per one side thereof, a film thickness preferably of 0.5 μm to 15 μm and more preferably of 2 μm to 10 μm.

The porous layer which has a film thickness of not less than 1 μm (not less than 0.5 μm per one side) makes if possible to sufficiently prevent an internal short circuit due to, for example, breakage of a battery in the nonaqueous electrolyte secondary battery laminated separator including the porous layer, and such a porous layer is preferable in that the porous layer makes it possible to maintain an amount of an electrolyte retained in the porous layer. Meanwhile, the porous layer whose both sides have a film thickness of not more than 30 μm in total (whose one side has a film thickness of not more than 15 μm) is preferable in that such a porous layer makes it possible to (i) prevent a deterioration, caused in a case where charge and discharge cycles are repeated, in (a) cathode of a nonaqueous electrolyte secondary battery and (b) rate characteristic and/or cycle characteristic by preventing an increase in permeation resistance of ions such as lithium ions in the entire nonaqueous electrolyte secondary battery laminated separator including the porous layer, and (ii) prevent an increase in size of the nonaqueous electrolyte secondary-battery by preventing an increase in distance between the cathode and an anode of the nonaqueous electrolyte secondary battery.

In a case where the porous layer is laminated to both sides of the porous film, physical properties of the porous layer which are described below at least refer to physical properties of the porous layer which is laminated to a surface of the porous film which surface faces the cathode of the nonaqueous electrolyte secondary battery which includes the laminated separator.

The porous layer, which only needs to have, per one side thereof, a mass per unit area which mass is appropriately determined in view of a strength, a film thickness, a weight, and handleability of the nonaqueous electrolyte secondary battery laminated separator, normally has a mass per unit area preferably of 1 g/m² to 20 g/m² and more preferably of 2 g/m² to 10 g/m² so that the nonaqueous electrolyte secondary battery which includes the nonaqueous electrolyte secondary battery laminated separator as a member can have a higher weight energy density and a higher volume energy density. The porous layer which has a mass per unit area which mass falls within the above range is preferable in that such a porous layer (i) allows the nonaqueous electrolyte secondary battery which includes, as a member, the nonaqueous electrolyte secondary battery laminated separator including the porous layer to have a higher weight energy density and a higher volume energy density, and (ii) allows the nonaqueous electrolyte secondary battery to have a lighter weight.

The porous layer has a porosity preferably of 20% by volume to 90% by volume and more preferably of 30% by volume to 70% by volume in that the nonaqueous electrolyte secondary battery laminated separator including such a porous layer can obtain sufficient ion permeability. Further, the porous layer has pores having a pore size preferably of not more than 1 μm and more preferably of not more than 0.5 μm in that the nonaqueous electrolyte secondary battery laminated separator including such, a porous layer can obtain sufficient ion permeability.

The laminated separator has a Gurley air permeability preferably of 30 sec/100 mL to 1000 sec/100 ml and more preferably of 50 sec/100 mL to 800 sec/100 mL. The laminated separator which has a Gurley air permeability falling within the above range makes it possible to obtain sufficient ion permeability in a case where the laminated separator is used as a member for the nonaqueous electrolyte secondary battery.

Meanwhile, the laminated separator which has a Gurley air permeability beyond the above range means that the laminated separator has a coarse laminated structure due to a high porosity thereof. This causes the laminated separator to have a lower strength, so that the laminated separator may be insufficient in shape stability, particularly shape stability at a high temperature. In contrast, the laminated separator which has a Gurley air permeability falling below the above range makes it impossible to obtain sufficient ion permeability in a case where the separator is used as a member for the nonaqueous electrolyte secondary battery. This may cause the nonaqueous electrolyte secondary battery to have a lower battery characteristic.

[2. Nonaqueous Electrolyte Secondary Battery Member, Nonaqueous Electrolyte Secondary Battery]

A nonaqueous electrolyte secondary battery member in accordance with an embodiment of the present invention is a nonaqueous electrolyte secondary battery member including a cathode, a nonaqueous electrolyte secondary battery separator or a nonaqueous electrolyte secondary battery laminated separator, and an anode that are provided in this order. A nonaqueous electrolyte secondary battery in accordance with an embodiment of the present invention includes a nonaqueous electrolyte secondary battery separator or a nonaqueous electrolyte secondary battery laminated separator. The following description is given by (i) taking a lithium ion secondary battery member as an example of the nonaqueous electrolyte secondary battery member and (ii) taking a lithium ion secondary battery as an example of the nonaqueous electrolyte secondary battery. Note that components of the nonaqueous electrolyte secondary battery member or the nonaqueous electrolyte secondary battery except the nonaqueous electrolyte secondary battery separator or the nonaqueous electrolyte secondary battery laminated separator are not limited to those discussed in the following description.

In the nonaqueous electrolyte secondary battery in accordance with an embodiment of the present invention, it is possible to use, for example, a nonaqueous electrolyte obtained by dissolving lithium salt in an organic solvent. Examples of the lithium salt include $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, $LiAlCl_4$, and the like. The above lithium salts can be used in only one kind or in combination of two or more kinds. Of the above lithium salts, at least one kind of fluorine-containing lithium salt selected from the group consisting of $LiPF_6$, $LiAsF_6$, $LiSbF_6$, $LiBF_4$, $LiCF_3SO_3$, $LiN(CF_3SO_2)_2$, and $LiC(CF_3SO_2)_3$ is more preferable.

Specific examples of the organic solvent of the nonaqueous electrolyte include: carbonates such as ethylene carbonate, propylene carbonate, dimethyl carbonate, diethyl carbonate, ethyl methyl carbonate, 4-trifluoromethyl-1,3-dioxolane-2-one, and 1,2-di(methoxycarbonyloxy)ethane; ethers such as 1,2-dimethoxyethane, 1,3-dimethoxypropane, pentafluoropropylmethyl ether, 2,2,3,3-tetrafluoropropyldifluoromethyl ether, tetrahydrofuran, and 2-methyltetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethylsulfoxide, and 1,3-propanesulfone; a fluorine-containing organic solvent obtained by introducing a fluorine group in the organic solvent; and the like. The above organic solvents can be used in only one kind or in combination of two or more kinds. Of the above organic solvents, a carbonate is more preferable, and a mixed solvent of cyclic carbonate and acyclic carbonate or a mixed solvent of cyclic carbonate and an ether is more preferable. The mixed solvent of cyclic carbonate and acyclic carbonate is more preferably exemplified by a mixed solvent containing ethylene carbonate, dimethyl carbonate, and ethyl methyl carbonate. This is because the mixed solvent containing ethylene carbonate, dimethyl carbonate, and ethyl methyl carbonate operates in a wide temperature range, and is refractory also in a case where a graphite material such as natural graphite or artificial graphite is used as an anode active material.

Normally, a sheet cathode in which a cathode current collector supports thereon a cathode mix containing a cathode active material, an electrically conductive material, and a binding agent is used as the cathode.

Examples of the cathode active material include a material that is capable of doping and dedoping lithium ions. Specific examples of such a material include lithium complex oxides each containing at least one kind of transition metal selected from the group consisting of V, Mn, Fe, Co, and Ni. Of the above lithium complex oxides, a lithium complex oxide having an $\alpha$-NaFeO$_2$ structure, such as lithium nickel oxide or lithium, cobalt oxide, or a lithium, complex oxide having a spinel structure, such as lithium manganate spinel is more preferable. This is because such a lithium complex oxide is high in average discharge potential. The lithium complex oxide can contain various metallic elements, and lithium nickel complex oxide is more preferable. Further, it is particularly preferable to use lithium nickel complex oxide which contains at least one kind of metallic element so that the at least one kind of metallic element accounts for 0.1 mol % to 20 mol % of a sum of the number of moles of the at least one kind of metallic element and the number of moles of Ni in lithium nickel oxide, the at least one kind of metallic element, being selected from the group consisting of Ti, Zr, Ce, Y, V, Cr, Mn, Fe, Co, Cu, Ag, Mg, Al, Ga, In, and Sn. This is because such lithium nickel complex oxide is excellent in cycle characteristic during use of the nonaqueous electrolyte-secondary battery at a high capacity. Especially an active material which contains Al or Mn and has an Ni content of not less than 85% and more preferably of not less than 90% is particularly preferable. This is because such an active material is excellent in cycle characteristic during use of the nonaqueous electrolyte secondary battery at a high capacity, the nonaqueous electrolyte secondary battery including the cathode containing the active material.

Examples of the electrically conductive material include carbonaceous materials such as natural graphite, artificial graphite, cokes, carbon black, pyrolytic carbons, carbon fiber, organic high molecular compound baked bodies, and the like. The above electrically conductive materials can be used in only one kind. Alternatively, the above electrically conductive materials can be used in combination of two or more kinds by, for example, mixed use of artificial graphite and carbon black.

Examples of the binding agent include polyvinylidene fluoride, a vinylidene fluoride copolymer, polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, an ethylene-tetrafluoroethylene copolymer, a vinylidene fluoride-tetrafluoroethylene copolymer, a vinylidene fluoride-tetrafluoroethylene trifluoroethylene copolymer, a vinylidene fluoride-trichloroethylene copolymer, and a vinylidene fluoride-vinyl fluoridecopolymer, a vinylidene fluoride-hexafluoropropylene-tetrafluoroethylene copolymer, thermoplastic resins such as thermoplastic polyimide, thermoplastic polyethylene, and thermoplastic polypropylene, acrylic resin, and styrene butadiene rubber. Note that the binding agent also functions as a thickener.

The cathode mix can be obtained by, for example, pressing the cathode active material, the electrically conductive material, and the binding agent on the cathode current collector, or causing the cathode active material, the electrically conductive material, and the binding agent to be in a form of paste by use of an appropriate organic solvent.

Examples of the cathode current collector include electrically conductive materials such as Al, Ni, and stainless steel, and Al, which is easy to process into a thin film and less expensive, is more preferable.

Examples of a method for producing the sheet cathode, i.e., a method for causing the cathode current collector to support the cathode mix include: a method in which the cathode active material, the electrically conductive material, and the binding agent which are to be formed into the cathode mix are pressure-molded on the cathode current collector; a method in which the cathode current collector is coated with the cathode mix which has been obtained by causing the cathode active material, the electrically conductive material, and the binding agent to be in a form of paste by use of an appropriate organic solvent, and a sheet cathode mix obtained by drying is pressed so as to be closely fixed to the cathode current collector; and the like.

Normally, a sheet anode in which an anode current collector supports thereon an anode mix containing an anode active material is used as the anode. The sheet anode preferably contains the electrically conductive material and the binding agent.

Examples of the anode active material include a material that is capable of doping and dedoping lithium ions, lithium metal or lithium alloy, and the like. Specific examples of such a material include: carbonaceous materials such as natural graphite, artificial graphite, cokes, carbon black, pyrolytic carbons, carbon fiber, and organic high molecular compound baked bodies; chalcogen compounds such as oxides and sulfides each doping and dedoping lithium ions at a lower potential, than that of the cathode; metals such as aluminum (Al), lead (Pb), tin (Sn), bismuth (Bi), and silicon (Si) each alloyed with an alkali metal; cubic intermetallic compounds (AlSb, Mg$_2$Si, NiSi$_2$) having lattice spaces in which alkali metals can be provided; lithium nitrogen compounds (Li$_{3-x}$M$_x$N (M: transition metal)); and the like. Of the above anode active materials, a carbonaceous material which contains, as a main component, a graphite material such as natural graphite or artificial graphite is preferable. This is because such a carbonaceous material is high in potential evenness, and a great energy density can be obtained in a case where the carbonaceous material, which is low in average discharge potential, is combined with the cathode. An anode active material which is a mixture of graphite and silicon and has an Si to C ratio of not less than 5% is more preferable, and an anode active material which is a mixture of graphite and silicon and has an Si to C ratio of not less than 10% is still more preferable.

The anode mix can be obtained by, for example, pressing the anode active material on the anode current collector, or causing the anode active material to be in a form of paste by use of an appropriate organic solvent.

Examples of the anode current collector include Cu, Ni, stainless steel, and the like, and Cu, which is difficult to alloy with lithium particularly in a lithium, ion secondary battery and easy to process into a thin film, is more preferable.

Examples of a method for producing the sheet anode, i.e., a method for causing the anode current collector to support the anode mix include: a method in which the anode active material to be formed into the anode mix is pressure-molded on the anode current collector; a method in which the anode current collector is coated with the anode mix which has been obtained by causing the anode active material to be in a form of paste by use of an appropriate organic solvent, and a sheet anode mix obtained by drying is pressed so as to be closely fixed, to the anode current collector; and the like. The paste preferably contains the electrically conductive material and the binding agent.

The nonaqueous electrolyte secondary battery member in accordance with an embodiment of the present invention is formed by providing the cathode, the nonaqueous electrolyte secondary battery separator or the nonaqueous electrolyte secondary battery laminated separator, and the anode in this order. Thereafter, the nonaqueous electrolyte secondary battery member is placed in a container serving as a housing of the nonaqueous electrolyte secondary battery. Subsequently, the container is filled with a nonaqueous electrolyte, and then the container is sealed while being decompressed. The nonaqueous electrolyte secondary battery in accordance with an embodiment of the present invention can thus be produced. The nonaqueous electrolyte secondary battery, which is not particularly limited in shape, can have any shape such as a sheet (paper) shape, a disc shape, a cylindrical shape, or a prismatic shape such as a rectangular prismatic shape. Note that a method for producing the nonaqueous electrolyte secondary battery is not particularly limited to any specific method, and a conventionally publicly known production method can be employed as the method.

EXAMPLES

The following description more specifically describes an embodiment of the present invention with reference to Examples and Comparative Examples. Note, however, that the present invention is not limited to those Examples.

<Method for Measuring Various Physical Properties>

Various physical properties of nonaqueous electrolyte secondary battery separators, which are porous films in accordance with the following Examples and Comparative Examples, were measured by the method below.

(1) Orientation Ratio and Degree of Orientation

An MD orientation ratio, a degree of MD orientation, and a degree of TD orientation, which are parameters of crystallinity of a porous film, were measured by use of an X-ray diffraction device (RAD-B, manufactured by Rigaku Corporation).

The MD orientation ratio was calculated from integrated intensities of peaks in a vicinity of $2\theta=21.3$, $23.7$, and $29.8$, the peaks having been obtained by scanning the porous film in MD and TD directions, and based on the following equation:

MD orientation ratio $R2=I(MD)/[I(MD)+I(TD)]\times 100$ where $I(MD)$ is the integrated intensity of the peak in the MD direction, and $I(TD)$ is the integrated intensity of the peak in the TD direction.

The degree of MD orientation was calculated from H, which is a half-width of each of the peaks in the vicinity of $2\theta=21.3$, $23.7$, and $29.8$, the peaks having been obtained by scanning the porous film in the MD direction, and based on the following equation:

Degree of orientation=$[(180-H)/180]\times 100$

The degree of TD orientation was calculated as in the case of the degree of MD orientation.

(2) Film Thickness

A thickness of the porous film was measured by use of VL-50A (manufactured by Mitutoyo Corporation) in conformity with JIS K7130. The measurement was carried out with respect to 10 places per 1 m² of the porous film, and an average of values obtained at those places was calculated.

(3) Mass Per Unit Area

The porous film was cut off to a 10-centimeter square, and a weight W(g) of that square was measured. Then, a mass per unit area was calculated based on the following equation:

Mass per unit area $(g/m^2)=W/(0.1\times 0.1)$ (4) Air Permeability (Gurley Value)

An air permeability (Gurley value (sec/100 cc)) of the porous film was measured by use of Gurley Densometer Type B (manufactured by Toyo Seiki Seisaku-Sho) in conformity with JIS P8117. The measurement was carried out with respect to 10 places per 1 m² of the porous film, and an average of values obtained at those places was calculated.

(5) Puncture Strength

A puncture test was carried out by use of KES-G5 Handy-Type Compression Tester (manufactured by KATO TECH CO., LTD.) under conditions of a radius of curvature of a needle tip of 0.5 mm and a puncture speed of 3.3 mm/sec, and a maximum puncture load (N) was regarded as a puncture strength. Note here that together with a gasket, made of silicon rubber, a sample was placed and fixed to a metallic flask (sample holder) having a hole having a diameter of $\phi$ 11.3 mm.

(6) Shutdown Temperature (SD Temperature)

A circular measurement sample having a diameter of 19.4 mm was cut out from the porous film, and this sample was set as a measurement sample. Further, members of 2032 Type Coin Cell (manufactured by Hohsen Corporation) were prepared. The members were a top cover, a bottom cover, a gasket, a kapton ring (having an outer diameter of 16.4 mm, an inner diameter of 8 mm, and a thickness of 0.05 mm), a spacer (circular spacer having a diameter of 15.5 mm and a thickness of 0.5 mm), and an aluminum ring (having an outer diameter of 16 mm, an inner diameter of 10 mm, and a thickness of 1.6 mm).

Then, the measurement sample and the gasket were provided in this order from the bottom cover and immersed with 10 μmL of an electrolyte. Thereafter, the kapton ring, the spacer, the aluminum ring, and the top cover were provided above the measurement sample in this order and sealed with a coin cell caulking device (manufactured by Hohsen Corporation), so that a measurement coin cell was prepared. Note here that as the electrolyte, used was an electrolyte (i) obtained by dissolving $LiBF_4$ in a mixed solvent in which propylene carbonate and NIKKOL BT-12 (manufactured by Nikko Chemicals Co., Ltd.) were mixed at a volume ratio of 91.5:8.5, and (ii) having a temperature of 25° C. and an $LiBF_4$ concentration of 1.0 mol/L.

A temperature inside the measurement coin cell was continuously measured by use of Digital Multimeter (7352A, manufactured by ADC CORPORATION) while being increased from a room temperature to 150° C. at a speed of 15°/min, and a resistance value at 1 kHz in the coin cell was continuously measured by use of LCR Meter (IM3523, manufactured by HIOKI E.E. CORPORATION).

The coin cell which had a resistance value of not less than 2000Ω at 1 kHz during the measurement was considered to have a shutdown function.

In this case, a temperature at which a resistance started increasing was defined as a shutdown temperature (SD temperature). Specifically, from a graph showing a relationship between a cell temperature and a resistance value, a point of intersection of a tangent to a resistance value of 2000Ω and a straight line, which is an extension line of a base resistance value obtained before the resistance started to greatly increase, was assumed to be the SD temperature (see FIG. 1).

(7) Measurement of Molecular Weight

A molecular weight of polyolefin contained in the porous film was measured by using, as a measurement device, Gel Chromatograph Alliance GPC2000 manufactured by Waters Corporation. The measurement was carried out under the following conditions.

Column: manufactured by TOSOH CORPORATION, TSKgel GMHHR-H(S)HT 30 cm×2, TSKgel GMH6-HTL 30 cm×2.

Mobile phase: o-dichlorobenzene

Detector: differential refractometer

Flow rate: 1.0 mL/min

Column temperature: 140° C.

Injected amount: 500 μL

Thirty mg of a sample was perfectly dissolved at 145° C. in 20 mL of o-dichlorobenzene, and then a resultant solution was filtered through a sintered filter having a pore diameter of 0.45 μm, and filtrate was used as a supply solution. Note that a calibration curve was prepared by use of 16 kinds of standard polystyrenes whose molecular weights were known.

(8) Measurement of Degree of Branching

A degree of branching of polyolefin was found by carrying out carbon nuclear magnetic resonance (13C NMR) spectrum measurement under the following measurement conditions, and in accordance with a 13C NMR spectrum, calculating, assuming that a sum total of peaks observed at 5 ppm to 50 ppm was 1000, a sum total of accumulated values of peaks having tops in ranges of 33.1 ppm to 33.3 ppm, 38.1 ppm to 38.3 ppm, and 39.7 ppm to 39.9 ppm.

<Measurement Conditions>

Device: AVANCEIII 600HD manufactured by Bruker BioSpin K.K.

Measurement probe: 10 mm CryoProbe

Measurement solvent: mixed solution having a volume ratio of 1,2-dichlorobenzene/1,1,2,2-tetrachloroethane-d2=85/15

Sample concentration: 20 mg/mL

Measurement, temperature: 135° C.

Measurement method: proton decoupling method

Number of times of accumulation: 3000 times

Pulse width: 45°

Pulse repetition time: 4 seconds

Measurement criterion: tetramethylsilane (9) Measurement of Amount of Heat of Melting.

Amounts of heat of melting of a raw resin and a porous film were measured by using DSC6200 (manufactured by Seiko Instruments Inc.) as a measurement device under the following conditions.

Analysis atmosphere: under airflow of $N_2$ at 50 mL/min

Temperature conditions:
first temperature increase from 30° C. to 180° C. (at 10° C./min)
second temperature increase from 30° C. to 180° C. (at 10° C./min)

Amounts of samples:
approximately 5.0 mg of raw resin
approximately 1.4 mg of porous film An area of a space between 114° C. to 140° C. the area having been obtained during the second temperature increase, was converted into an amount of heat of melting per mass.

(10) Retention Rate of Film in Width Direction During High Speed Web Handling

As an evaluation of deformation of the film in a width direction during high speed winding, a retention rate (%) of the film was found based on the following equation: retention rate (%)=D2/D1×100 where D1 is a width of the film which width, is obtained before high speed coating is carried out with respect to a heat-resistant layer (described later) at 40 m/min and the film is wound at 120 N, which is a tension set in a winding machine, and D2 is a width of the film which width is obtained after high speed coating is carried out with respect to the heat-resistant layer at 40 m/min and the film is wound at 120 N.

(11) Curling Evaluation

The porous film to which the beat-resistant layer (described later) had been laminated was cut out, by use of a cutter, into sample pieces each having sides of 8 centimeters. The sample pieces were left to stand at a room temperature of 25° C. and a humidity of 50% for 5 minutes. Then, an amount of warpage of a film end from a floor surface was measured.

<Preparation of Nonaqueous Electrolyte Secondary Battery Separator>

Porous films in accordance with Examples 1 through 3 and Comparative Examples 1 and 2, each of which porous films is to be used in a nonaqueous electrolyte secondary battery separator or a nonaqueous electrolyte secondary battery laminated separator, were prepared as below.

Example 1

With 100 parts by weight of polyethylene powder (GUR2024, manufactured by Celanese Corporation and having a weight average molecular weight of 4,970,000, a melting point of 134° C., and an amount of heat of melting of 126 mJ/mg), 43 parts by weight of olefin-based wax powder (FNP115, manufactured by NIPPON SEIKO CO., LTD. and having a weight average molecular weight, of 1000 and a melting point of 115° C.) and 170 parts by weight of calcium carbonate (manufactured by MARUO CALCIUM CO., LTD. and having an average particle diameter, found by SEM, of 0.10 μm) were mixed in Henschel mixer, and then a resultant mixture was kneaded by use of a double-screw kneader while a temperature was set at a cylinder temperature of 230° C., so that a polyolefin-based resin composition was obtained. The polyolefin-based resin composition was rolled by use of a pair of rollers having a surface temperature of approximately 150° C. and rotating at an identical circumferential speed, so that a sheet (1) was prepared.

Figure 2:
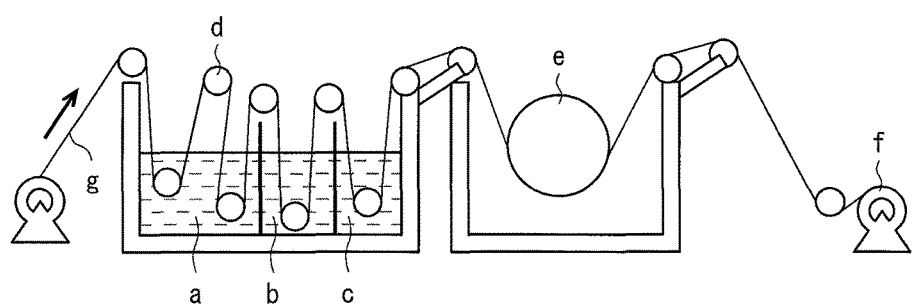
FIG. 2 schematically illustrates a device used in Examples to remove a water-soluble filler from a sheet made of a polyethylene resin composition.

Next, the calcium carbonate contained in the sheet (1) (indicated by a reference sign g in FIG. 2) was removed by use of a device illustrated in FIG. 2. The sheet (1) was transferred by use of a guide roller d and immersed for 15 minutes in a bathtub a containing an aqueous hydrochloric solution (in which 2 mol/L to 4 mol/L of hydrochloric acid and 0.1% by weight to 0.5% by weight of a non-ionic surfactant were blended), so that the calcium carbonate was removed. Subsequently, the sheet was neutralized by being immersed for 2 minutes in a bathtub b containing an aqueous solution of sodium hydroxide (0.1 mol/L to 2 mol/L). Further, the sheet was cleaned with water for 5 minutes in a bathtub c containing water. Finally, the sheet was dried by being brought into contact with a drying drum (roller) e heated at 50° C., so that the sheet was wound by use of a winding machine f. Thereafter, the sheet was stretched sevenfold in a TD direction by use of a tenter (at a stretching temperature of 103° C.) and subjected to a heat fixation process (at a heat fixation temperature (annealing temperature) of 127° C. Table 1 shows physical properties of a porous film thus obtained.

Example 2

With 100 parts by weight of polyethylene powder (GUR2024, manufactured by Celanese Corporation and having a weight average molecular weight of 4,970,000, a melting point of 134° C., and an amount of heat of melting of 126mJ/mg), 37 parts by weight of olefin-based wax powder (FNP115, manufactured by NIPPON SEIKO CO., LTD. and having a weight average molecular weight of 1000 and a melting point, of 115° C.) and 170 parts by weight of calcium carbonate (manufactured by MARUO CALCIUM CO., LTD. and having an average panicle diameter, found by SEM, of 0.10 μm) were mixed in Henschel mixer, and then a resultant mixture was kneaded by use of a double-screw kneader while a temperature was set at 230° C., so that a polyolefin-based resin composition was obtained. The polyolefin-based resin composition was rolled by use of the pair of rollers having a surface temperature of approximately 150° C. and rotating at an identical circumferential speed, so that a sheet (2) was prepared.

Next, the calcium carbonate contained in the sheet (2) (indicated by the reference sign g in FIG. 2) was removed by use of the device illustrated in FIG. 2. The sheet (2) was transferred by use of the guide roller d and immersed for 15 minutes in the bathtub a containing an aqueous hydrochloric solution (in which 2 mol/L to 4 mol/L of hydrochloric acid and 0.1% by weight to 0.5% by weight of a non-ionic surfactant were blended), so that the calcium carbonate was removed. Subsequently, the sheet was neutralized by being immersed for 2 minutes in the bathtub b containing an aqueous solution of sodium hydroxide (0.1 mol/L to 2 mol/L). Further, the sheet was cleaned with water for 5 minutes in the bathtub c containing water. Finally, the sheet, was dried by being brought into contact with the drying drum e heated at 50° C., so that the sheet was wound by use of the winding machine f. Thereafter, the sheet was stretched sevenfold in a TD direction by use of a tenter (at a stretching temperature of 103° C.) and subjected to a heat fixation process (at a heat fixation temperature (annealing temperature) of 127° C.). Table 1 shows physical properties of a porous film thus obtained.

Example 3

With 100 parts by weight of polyethylene powder (GUR2024, manufactured by Celanese Corporation and having a weight average molecular weight of 4,970,000, a melting point of 134° C., and an amount of heat of melting of 126 mJ/mg), 43 parts by weight of olefin-based wax powder (FNP115, manufactured by NIPPON SEIRO CO., LTD. and having a weight average molecular weight of 1000 and a melting point of 115° C.) and 170 parts by weight of calcium carbonate (manufactured by MARUO CALCIUM CO., LTD. and having an average particle diameter, found by SEM, of 0.10 μm) were mixed in Hensehel mixer, and then a resultant mixture was kneaded by use of a double-screw kneader while a temperature was set at a cylinder temperature of 230° C., so that a polyolefin-based resin composition was obtained. The polyolefin-based resin composition was rolled by use of a pair of rollers having a surface temperature of approximately 151° C. and rotating at an identical circumferential speed, so that a sheet (3) was prepared.

Next, the calcium carbonate contained in the sheet (3) (indicated by the reference sign g in FIG. 2) was removed by use of the device illustrated in FIG. 2. The sheet (3) was transferred by use of the guide roller d and immersed for 15 minutes in the bathtub a containing an aqueous hydrochloric solution (in which 2 mol/L to 4 mol/L of hydrochloric acid and 0.1% by weight to 0.5% by weight of a non-ionic surfactant were blended), so that the calcium carbonate was removed. Subsequently, the sheet was neutralized by being immersed for 2 minutes in the bathtub b containing an aqueous solution of sodium hydroxide (0.1 mol/L to 2 mol/L). Further, the sheet was cleaned with water for 5 minutes in the bathtub c containing water. Finally, the sheet was dried by being brought into contact with the drying drum (roller) e heated at 50° C., so that the sheet was wound by use of the winding machine f. Thereafter, the sheet was stretched 5.4-fold in a TD direction by use of a tenter (at a stretching temperature of 110° C.) and subjected to a heat fixation process (at a heat fixation temperature (annealing temperature) of 124° C.). Table 1 shows physical properties of a porous film thus obtained.

Comparative Example 1

With 100 parts by weight of polyethylene powder (GURX198, manufactured by Celanese Corporation and having a weight average molecular weight of 4,790,000, a melting point of 134° C., and an amount of heat of melting of 112 mJ/mg), 37 parts by weight of olefin-based wax powder (FNP115, manufactured by NIPPON SEIKO CO., LTD. and having a weight average molecular weight of 1000 and a melting point of 115° C.) and 170 parts by weight of calcium carbonate (manufactured by MARUO CALCIUM CO., LTD. and having an average particle diameter, found by SEM, of 0.10 μm) were mixed in Henschel mixer, and then a resultant mixture was kneaded by use of a double-screw kneader, so that a polyolefin-based resin composition was obtained. The polyolefin-based resin composition was rolled by use of a pair of rollers having a surface temperature of approximately 150° C. and rotating at an identical circumferential speed, so that a sheet (4) was prepared.

Next, the calcium carbonate contained in the sheet (4) was removed by use of the device illustrated in FIG. 2. The sheet (4) was transferred by use of the guide roller d and immersed for 15 minutes in the bathtub a containing an aqueous hydrochloric solution (in which 2 mol/L to 4 mol/L of hydrochloric acid and 0.1% by weight to 0.5% by weight of a non-ionic surfactant were blended), so that the calcium carbonate was removed. Subsequently, the sheet was neutralized by being immersed for 2 minutes in the bathtub b containing an aqueous solution of sodium hydroxide (0.1 mol/L to 2 mol/L). Further, the sheet was cleaned with water for 5 minutes in the bathtub c containing water. Finally, the sheet, was dried by being brought into contact with the drying drum (roller) e heated at 50° C., so that the sheet was wound by use of the winding machine f. Thereafter, the sheet was stretched sevenfold in a TD direction by use of a tenter (at a stretching temperature of 103° C.) and subjected to a heat fixation process (at a heat fixation temperature (annealing temperature) of 127° C.). Table 1 shows physical properties of a porous film thus obtained.

Comparative Example 2

Table 1 shows physical properties of a commercially available polyolefin porous film for use in a nonaqueous electrolyte secondary battery.

(Heat-Resistant Layer)

The heat-resistant layer used to carry out each of "(10) Retention rate of film in width direction during high speed web handling" (described earlier) and "(11) Curling evaluation" (described earlier) was laminated to the porous film as below.

(Synthesis of para-aramid (poly(paraphenylene terephthalamide))

Poly(paraphenylene terephthalamide) was produced by use of a 3-liter separable, flask having a stirring vane, a thermometer, a nitrogen inhalant canal, and a powder supply port. The flask was sufficiently dried, 2200 g of N-methyl-2-pyrrolidone (NMP) was placed in the flask, and 151.07 g of calcium chloride powder that had been vacuum-dried at 200° C. for 2 hours was added to the NMP and then completely dissolved in the NMP while a temperature of a mixture of the NMP and the calcium chloride powder were raised to 100° C. The temperature was brought down to a room temperature, and 68.23 g of paraphenylenediamine was added to and completely dissolved in a resultant mixture. While a resultant solution was maintained at 20° C.±2° C. 124.97 g of dichloride terephthalate, which was separated into 10 pieces, was one-by-one added to the solution at approximately 5-minute intervals. Thereafter, a resultant, solution was ripened for 1 hour while being stirred and maintained at 20° C.±2° C. Then, the solution was filtered through 1500-mesh stainless steel gauze. An obtained solution exhibited optical anisotropy in a liquid crystal phase at a para-aramid concentration of 6%. A para-aramid solution was partially sampled and reprecipitated with water, so that para-aramid was obtained. The obtained para-aramid had an intrinsic viscosity of 2.02 dl/g.

Note here that the intrinsic viscosity of the para-aramid was measured as below.

First, a polymerization solution was dropped into water, ground by use of a mixer, and filtered, so that a para-aramid polymer was obtained. Subsequently, 0.5 g of the para-aramid polymer which had been vacuum-dried at 300° C. for 1 hour was dissolved in 100 ml of 98% sulfuric acid. Then, respective flow times of a para-aramid sulfuric acid solution and 98% sulfuric acid were measured by use of a capillary viscometer at 30° C., and the intrinsic viscosity was found in accordance with a ratio between the flow times thus measured and based on the following equation:

Intrinsic viscosity=$\ln(T/T_0)/C$ [unit: dl/g]

where T is the flow time of the para-aramid sulfuric acid solution, $T_0$ is the flow time of the sulfuric acid, and C is a para-aramid concentration (g/dl) in the para-aramid sulfuric acid solution.

(Preparation of Coating Solution)

Into a flask, 100 g of a para-aramid solution that had been polymerized in advance was weighed out. Then, 243 g of NMP was added to the solution. Finally, a resultant mixture was prepared so as to be an isotropic-phase solution having a para-aramid concentration of 1.75% by weight, and the isotropic-phase solution was stirred for 60 minutes. With the above solution having a para-aramid concentration of 1.75% by weight, 6 g (relative to 100 parts by weight of para-aramid) of Aeroxide Alu-C (manufactured by NIPPON AEROSIL CO., LTD.) and 6 g (relative to 100 parts by weight of para-aramid) of Advanced Alumina AA-03 (manufactured by Sumitomo Chemical Co., Ltd.) were mixed. Then, a resultant mixture was stirred for 240 minutes. Coated dope in which alumina fine particles had been sufficiently dispersed was filtered through 1000-mesh gauze. Thereafter, 0.73 g of calcium oxide was added to the dope, a resultant mixture was neutralized while being stirred for 240 minutes, and defoaming was carried out under a reduced pressure, so that a slurry coating solution was obtained.

(Method for Laminating Heat-Resistant Layer to Porous Film)

A roller (approximately 1 mm in width and 1000 m in length) of each of the porous films of Examples 1 through 3 and Comparative Examples 1 and 2 was mounted on an unwinding machine. In this case, an accurate width D1 mm of a porous film was measured. Then, the porous film was coated with a coating solution while being stretched out at a tension of 120 N/m and a line speed of 40 m/min, so that a heat-resistant layer was continuously prepared on the porous film.

First, a lower surface of the porous film stretched out was coated with NMP by use of a microgravure coater, and an upper surface of the porous film was coated with a prepared coating solution by use of a bar coater so as to have a thickness of 100 μm. Then, the porous film was allowed to pass through a thermohygrostat (at a temperature of 50° C. and a relative humidity of 70%) so as to deposit para-aramid out of the coating solution with which the porous film had been coated. Subsequently, the porous film was allowed to pass through a water washing device so as to remove NMP and calcium, chloride each having been contained in the film. Thereafter, while being supplied with hot air by use of a Yankee dryer, the film was allowed to pass through a heated roller (having a surface temperature of 60° C. to 90° C.) so as to dry-remove moisture, so that a nonaqueous electrolyte secondary battery laminated separator in which the heat-resistant layer was laminated to one side of the porous film was obtained. Then, the nonaqueous electrolyte secondary battery laminated separator was wound around a 3-inch paper tube at a tension of 120 N/m.

A final width D2 of each of the films coated and wound was found, and a retention rate (%) (expressed as D2/D1× 100) of a film in a width direction during high speed web handling was found. Further, the curling evaluation (described earlier) was carried out.

TABLE 1

| | Physical properties of porous film | | | | |
|---|---|---|---|---|---|
| | Degree of MD orientation % | Degree of TD orientation % | MD orientation ratio % | Thickness μm | Mass per unit area g/m² |
| Example 1 | 77 | 81 | 66 | 9.6 | 5.4 |
| Example 2 | 74 | 83 | 62 | 9.7 | 5.4 |
| Example 3 | 79 | 67 | 67 | 12.1 | 7.0 |
| Comparative Example 1 | 77 | 82 | 54 | 10.2 | 5.7 |
| Comparative Example 2 | 86 | 0 | 100 | 12.8 | 6.8 |

| | Physical properties of porous film | | | | |
|---|---|---|---|---|---|
| | Air permeability sec/100 cc | Puncture strength N | SD temperature ° C. | Amount of heat of melting mJ/mg | Degree of branching of resin branches/ 1000 c |
| Example 1 | 167 | 3.99 | 142.7 | 119 | 0.45 |
| Example 2 | 135 | 3.88 | 143.2 | 120 | 0.38 |
| Example 3 | 195 | 3.43 | 139.3 | 119 | 0.42 |
| Comparative Example 1 | 219 | 3.66 | 145.9 | 113 | 0.45 |
| Comparative Example 2 | 265 | 1.67 | 139.1 | 119 | 0.57 |

TABLE 1-continued

|  | State of film after coating | |
| --- | --- | --- |
|  | Retention rate % | Curling amount mm |
| Example 1 | 93 | not more than 1 |
| Example 2 | 93 | not more than 1 |
| Example 3 | 90 | 3.1 |
| Comparative Example 1 | 92 | not more than 1 |
| Comparative Example 2 | 99 | not less than 10 |

As shown in Table 1, the porous film of each of Examples 1 through 3, which porous film had an MD orientation ratio in a range of 58% to 80%, a degree of MD orientation in a range of 70% to 80%, and a degree of TD orientation in a range of 65% to 85%, ensured a puncture strength of not less than 3.4 N while having a shutdown temperature of not more than 144° C. This reveals that the porous film of each of Examples 1 through 3 was excellent in shutdown temperature and strength.

In contrast, the porous film of Comparative Example 1 had an MD orientation ratio as low as 54%. This reveals that the porous film of Comparative Example 1 had a shutdown temperature as high as 145.9° C. Further, the porous film of Comparative Example 2 was low in puncture strength.

The porous film of each of Examples 1 through 3 ensured a retention rate of a film in a width direction during high speed web handling of not less than 90% and achieved a reduced curling amount of less than 4 mm. That is, the porous film of each of Examples 1 through 3 can be prevented from being deformed (stretched or warped). A porous film which has a curling amount of not less than 4 mm is highly likely to produce a fold in a rolled part thereof while being transferred. Note, however, that the porous film of each of Examples 1 through 3, which porous film had a reduced curling amount of less than 4 mm, makes it possible to prevent production of a fold. In contrast, the porous film of Comparative Example 2 had an MD orientation ratio as high as 100%. This reveals that the porous film of Comparative Example 2 had a curling amount as large as not less than 10 mm and made it impossible to prevent film deformation (warpage).

REFERENCE SIGNS LIST a: Bathtub (aqueous acid solution)
b: Bathtub (aqueous alkaline solution)
c: Bathtub (water)
d: Guide roller
e: Drying drum (heating drum)
f: Winding machine
g: Sheet

The invention claimed is:

1. A nonaqueous electrolyte secondary battery separator comprising a porous film containing polyolefin in an amount of not less than 50% by volume, wherein the polyolefin has a weight average molecular weight of not less than 500,000 and has 0.1 branches to 0.9 branches per 1000 carbon atoms,
the nonaqueous electrolyte secondary battery separator having an MD orientation ratio of 58% to 80%, a degree of MD orientation of 70% to 80%, a degree of TD orientation of 65% to 85%, a film thickness of not more than 14 µm, and a shutdown temperature of 139.3° C. to 144° C.

2. The nonaqueous electrolyte secondary battery separator as set forth in claim 1, wherein the nonaqueous electrolyte secondary battery separator has a Gurley air permeability of 50 sec/100 cc to 300 sec/100 cc.

3. The nonaqueous electrolyte secondary battery separator as set forth in claim 1, wherein the polyolefin has an amount of heat of crystalline melting of 115 mJ/mg to 130 mJ/mg.

4. The nonaqueous electrolyte secondary battery separator as set forth in claim 1, wherein the nonaqueous electrolyte secondary battery separator has a puncture strength of not less than 3.4 N.

5. A nonaqueous electrolyte secondary battery laminated separator comprising:
a nonaqueous electrolyte secondary battery separator recited in claim 1; and
a porous layer.

6. A nonaqueous electrolyte secondary battery member comprising:
a cathode;
a nonaqueous electrolyte secondary battery laminated separator recited in claim 5; and
an anode,
the cathode, the nonaqueous electrolyte secondary battery laminated separator, and the anode being provided in this order.

7. A nonaqueous electrolyte secondary battery comprising:
a nonaqueous electrolyte secondary battery laminated separator recited in claim 5.

8. A nonaqueous electrolyte secondary battery member comprising:
a cathode;
a nonaqueous electrolyte secondary battery separator recited in claim 1; and
an anode,
the cathode, the nonaqueous electrolyte secondary battery separator, and the anode being provided in this order.

9. A nonaqueous electrolyte secondary battery comprising:
a nonaqueous electrolyte secondary battery separator recited in claim 1.

* * * * *